United States Patent Office 2,740,811
Patented Apr. 3, 1956

2,740,811

METHOD OF PREPARING TEREPHTHALIC ACID

Rudolf Lotz, Klingenberg (Main), Germany, assignor to Vereinigte Glanzstoff-Fabriken A. G., Wuppertal-Elberfeld, Germany No Drawing. Application March 31, 1953,
Serial No. 346,050

Claims priority, application Germany April 9, 1952

7 Claims. (Cl. 260—523)

This invention relates to the preparation of terephthalic acid.

My copending application for U. S. Letters Patent Serial Number 333,340, filed January 26, 1953, discloses a method of preparing terephthalic acid which comprises treating p-xylylene dichloride at a temperature above the melting point of p-xylylene dichloride and at ordinary pressure, with nitric acid of medium concentration, and preferably a concentration from about 20 to about 40 per cent. If yields in excess of 90 per cent are desired the reaction must be carried out in two stages, i. e. the intermediate oxidation products obtained in reacting a first batch and chiefly consisting of terephthalic aldehyde

must be returned to a second batch for final conversion purposes.

It is an object of the present invention to provide a method of preparing terephthalic acid with yields exceeding 90 per cent, yet in a single stage operation.

It is another object of this invention to provide a method of preparing terephthalic acid distinguished by its lily-white appearance.

Other objects, and the manner in which the same are attained, will become apparent as this specification proceeds.

The present invention contemplates a method of preparing terephthalic acid at yields exceeding 90 per cent, in a single stage operation, which comprises treating p-xylylene dichloride at a temperature above the melting point of p-xylylene dichloride and at ordinary pressure, with nitric acid of a concentration from about 30 to about 65 per cent, and preferably from about 45 to about 60 per cent. It is of material advantage in the execution of the invention if the oxidation capacity of the nitric acid is increased. This increase in the oxidation capacity of the nitric acid may be effected by returning the nitrous gases formed in the course of the reaction, such as $NO_2$, $NO$, $NOCl$, $N_2O_3$, again to the reaction mixture. Alternatively, the increase in the oxidation capacity of the nitric acid also may be obtained in the following manner: the starting product, to wit: p-xylylene dichloride, is premixed either with water, or with diluted nitric acid or the mother liquor of a previous charge whereupon nitric acid of a concentration exceeding 40 per cent is added drop by drop while the mixture is gradually heated to 110° C. The concentration of the nitric acid is calculated so that finally a concentration from about 30 to about 65 per cent, and preferably from about 45 to about 60 per cent, is present.

Instead of using either one of the afore-noted measures for increasing the oxidation capacity of the nitric acid, it is also possible to combine the two measures and in this event, to effect the reaction in a manner such that the starting material, at first, is premixed with water or diluted nitric acid, nitric acid of a predetermined concentration is added and the nitrous gases formed in the course of the reaction are returned to the reaction mixture.

The measures described above have the important result that throughout the entire reaction, the reaction mixture is exposed to the influence of relatively high concentrations of the substances having an oxidizing effect.

The terephthalic acid obtained as the end-product by the method according to the present invention, is distinguished by its lily-white appearance.

The invention will be more fully described by reference to the following specific examples. It should be understood, however, that the examples are given by way of illustration only, and that the invention is not to be limited by the details set forth therein.

Example I 400 g. of p-xylylene dichloride are premixed with 660 g. of water and gradually heated to 100° C., under vigorous stirring. Hereupon, 1832 g. of nitric acid of a concentration from about 60 to about 65 per cent, are added drop by drop while at the same time, the temperature is raised to 110° C. After a certain time a generation of HCl accompanied by a mild foaming up, is observed. After the lapse of from 3 to 4 hours the reaction is completed with the result that already when still at elevated temperature, but particularly upon cooling, a thoroughly white product is obtained. The yield of terephthalic acid amounts to 92 per cent, a very small quantity only of terephthalic aldehyde being also obtained.

Example II

To 400 g. of p-xylylene dichloride are added, drop by drop, 2500 g. of nitric acid of 40 per cent concentration while slowly heating to 100° C. Toward the end of the addition of nitric acid the temperature of the mixture is raised to 110° C. The nitrous gases also generated are recycled, through a cooler, to the reaction mixture. After 3 to 4 hours the reaction is terminated and particularly upon cooling, terephthalic acid separates out from the reaction mixture, as a perfectly white product, at a yield of 98 per cent of the theoretical yield. A very small quantity of terephthalic aldehyde is obtained as a by-product.

Example III 2000 g. of p-xylylene dichloride are premixed with 3700 g. of the mother liquor of a previous batch subjected to oxidation. The mother liquor still has a content of nitric acid in the amount of 5 per cent. The mixture is heated slowly to 100° C. under vigorous stirring. Thereafter 8000 g. of nitric acid of 60 per cent concentration are added drop by drop while at the same time the temperature is raised to 110° C. After some time a generation of HCl sets in. The nitrogenous gases generated at the same time are recycled through a cooler, to the reaction solution. The yield of terephthalic acid obtained on completion of the reaction, is 90 per cent of the theoretical yield.

While I have disclosed the preferred embodiments of my invention and the preferred modes of carrying it into effect, it will be readily apparent to those skilled in the art that the invention as illustrated in the foregoing specification, is susceptible to numerous variations without departure from the spirit of the invention or sacrifice of the advantages thereof. Accordingly, the scope of the invention is to be understood as limited solely by the appended claims.

I claim:

1. The method of preparing terephthalic acid which comprises treating p-xylene dichloride at ordinary pressure and at an elevated temperature slightly above the melting point of p-xylylene dichloride with nitric acid of a concentration ranging between about 30 and 65 per cent.

2. The method of preparing terephthalic acid, which comprises premixing p-xylylene dichloride with a substance selected from the class consisting of water, diluted nitric acid, the mother liquor of a previous batch, and treating the mixture thus obtained at ordinary pressure at a temperature slightly above the melting point of p-xylylene dichloride, with nitric acid of a concentration of from about 30 to about 65 per cent.

3. The method of preparing terephthalic acid, which comprises treating p-xylylene dichloride at ordinary pressure at a temperature not substantially exceeding 110° C. with nitric acid of 45 to about 60 per cent and returning the nitrous gases such as $NO_2$, NO, NOCl, $N_2O_3$ generated in the course of the reaction, again to the reaction mixture.

4. The method of preparing terephthalic acid, which comprises premixing p-xylylene dichloride with a substance selected from the class consisting of water, diluted nitric acid, the mother liquor of a previous batch, treating the mixture thus obtained at ordinary pressure at a temperature not substantially exceeding 100° C., with nitric acid of a concentration of from about 30 to about 65 per cent, and returning the nitrous gases such as $NO_2$, NO, NOCl, $N_2O_3$ generated in the course of the reaction, again to the reaction mixture.

5. The method of preparing terephthalic acid, which comprises premixing p-xylylene dichloride with water, heating the mixture thus obtained at ordinary pressure to about 100° C., adding nitric acid of a concentration from about 60 to about 65 per cent while raising the temperature to about 110° C., permitting the reaction to proceed for several hours, cooling and recovering the perfectly white terephthalic acid.

6. The method of preparing terephthalic acid, which comprises adding to p-xylylene dichloride, nitric acid of 40 per cent concentration, while heating at ordinary pressure to about 100° C., raising at the end of said addition the temperature to about 110° C., permitting the reaction to proceed for several hours while recycling, under cooling, any nitrogenous gases generated in the course of the reaction, to the reaction mixture, cooling and recovering the perfectly white terephthalic acid.

7. The method of preparing terephthalic acid, which comprises premixing p-xylylene dichloride with the mother liquor from a previous batch, heating the mixture under ordinary pressure to about 100° C., adding nitric acid of about 60 per cent concentration while raising the temperature to about 110° C., permitting the reaction to proceed for several hours while recycling, under cooling, any nitrogenous gases generated in the course of the reaction, to the reaction mixture, cooling and recovering the terephthalic acid.

References Cited in the file of this patent

UNITED STATES PATENTS 2,666,786     Kulka et al. _____ Jan. 19, 1954